July 20, 1965 G. S. BAHRS 3,196,338
AMPLIFYING AND SWITCHING CIRCUIT
Filed Aug. 22, 1960
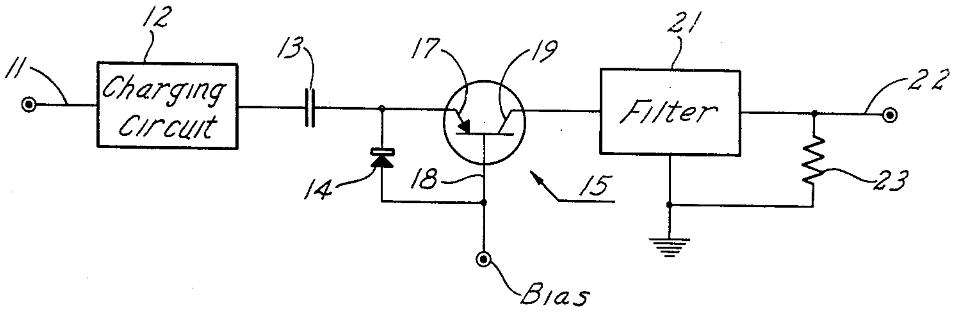
INVENTOR.
George S. Bahrs.
BY
Flehr & Swain
ATTORNEYS 3,196,338
AMPLIFYING AND SWITCHING CIRCUIT
George S. Bahrs, 449 Hall St., Palo Alto, Calif.
Filed Aug. 22, 1960, Ser. No. 51,122
2 Claims. (Cl. 321—47)

This invention relates generally to an amplifier and switching circuit.

In copending application entitled "Frequency to Voltage Converter," Serial No. 777,936, filed December 3, 1958, there is described a circuit which includes a precision capacitor having first and second terminals. One of the terminals of the capacitor is swung between predetermined voltage limits a fixed number of times for each cycle of an input signal. Switching means are provided in said converter for directing charging and discharging currents to the other terminal of the capacitor. An amplifier is included in circuit with the second terminal to pass at least one of said charging or discharging currents and to isolate the second terminal of the capacitor from voltage variations in associated circuits. Suitable means are provided for giving an indication of the average charging or discharging current to give an output voltage which is indicative of input frequency.

It is a general object of the present invention to provide a novel transistor circuit which in a single stage performs the switching and amplifying functions.

It is another object of the present invention to provide an amplifier and switching circuit which is inexpensive, simple in construction, and reliable in operation.

It is another object of the present invention to provide an amplifier and switching circuit which has a low input impedance, high output impedance, lower power dissipation, and constant current gain.

These and other objects will be more clearly apparent from the following description taken in conjunction with the accompanying drawing.

The single figure of the drawing illustrates a circuit embodying the objects of the invention.

The input signal is applied to the terminal 11 and thence to the charging circuit 12. The charging circuit may be any circuit suitable for charging the precision capacitor 13 to a predetermined fixed voltage and discharging it to some other fixed voltage a fixed number of times for each cycle of the input signal. Suitable charging circuits are described in said copending application and in copending application Serial No. 778,015, filed December 3, 1958.

The output from the charging circuit is applied to one terminal of the precision capacitor 13. Connected to the other terminal of the capacitor is a diode 14 and a transistor 15 having emitter, base and collector electrodes 17, 18 and 19, respectively. The diode 14 is connected between the emitter and base electrodes. The collector electrode is connected to a filter 21 which serves to receive the charging or discharging current and provide a filtered D.-C. output at the terminal 22. The output is indicative of the input frequency.

The transistor 15 is connected to perform a switching function as well as to provide isolation between the one terminal of the capacitor and the output circuits. The amplifier has a relatively high voltage gain and low input impedance whereby the voltage changes at the second terminal of the capacitor are small in relation and relatively independent of output voltage. As a result, the net voltage excursions to which the second terminal of the capaictor are subjected are relatively small and virtually constant. The voltage excursions of the first terminal are determined by the charging circuit. Thus, the net, or terminal-to-terminal, voltage excursions experienced by the capacitor are virtually independent of the output voltage.

Referring to the circuit, the positive bias voltage applied to the base of the transistor is made greater than the largest voltage swing expected at the filter input. The collector-base junction is, therefore, always reverse biased so that the transistor is able to function as a common base amplifier. The emitter-base junction serves to conduct current of one polarity from the second terminal of the capacitor. Because the current gain of a common base amplifier is very nearly unity, virtually all the current which enters the emitter emerges from the collector and flows through the filter into the output load 23. Capacitor current of one polarity is conducted by the transistor. The diode 14 is provided to conduct current of the opposite polarity. When the diode is conducting, its voltage drop is a small fraction of one volt. When the transistor is passing current, the emitter junction drop is generally a small fraction of one volt and this drop is virtually independent of the collector voltage. Thus, the voltage excursions at the second capacitor terminal are relatively small and virtually independent of the voltage at the input to the filter. Thus, the circuit serves to direct virtually all of the capacitor charging current to the filter input while effectively isolating the second capacitor terminal from the voltage variations appearing at the filter input.

It is seen that there is provided a circuit which is simple in construction, and that the arrangement is such that there is low power dissipation in the transistor since the current flow through the same only during a part of the cycle, that is, somewhat less than one-half the time. The filter is fed from a very high impedance, namely, the collector resistance of the transistor which is typically several megohms. The result is that the filter may be of simple design.

Thus, there is provided a simple, inexpensive, reliable and efficient circuit for conducting charging and discharging currents from a precision capacitor for directing one of these currents to an output circuit and for isolating one terminal of the capacitor from the voltage variations appearing in the output circuit.

I claim:

1. A circuit of the character described for directing currents of opposite polarity to an associated element and for applying one of said currents to an associated load compriing a transistor having emitter, collector and base electrodes, means for serially connecting the emitter and collector electrodes between the element and the load, uni-directional current conducting means connected between emitter and base electrodes, and means for applying a bias voltage to the base of said transistor which voltage is greater than the highest voltage at the load.

2. In a circuit of the character described wherein a capacitor having two terminals has one of its terminals swung between predetermined voltage limits, means for directing charging and discharging current from the other terminal of said capacitor, output means connected to said directing means, said directing means comprising a transistor having emitter, base and collector terminals, a diode connected across the emitter and base terminals, the emitter being connected to said other capacitor terminal, the base connected to a source of bias potential which potential is greater than the highest voltage at the output circuit, and the collector connected to said output circuit.

References Cited by the Examiner

UNITED STATES PATENTS

| | | | |
|---|---|---|---|
| 2,660,624 | 11/53 | Bergson | 323—22 |
| 2,728,857 | 12/55 | Sziklai | 307—88.5 |
| 2,891,726 | 6/59 | Decker | 307—88.5 |
| 2,907,932 | 10/59 | Patchell | 307—88.5 |
| 2,915,636 | 12/59 | Cluwen | 307—88.5 |
| 2,939,065 | 5/60 | Matulaitis | 323—22 |
| 2,953,738 | 9/60 | Bright | 321—8 X |
| 3,049,677 | 8/62 | Wolfendale | 331—111 |

LLOYD McCOLLUM, *Primary Examiner.*

SAMUEL BERNSTEIN, RALPH D. BLAKESLEE, *Examiners.*